Feb. 15, 1966    R. E. BOSE ETAL    3,235,090
HYDROCLONES
Filed Dec. 15, 1961    3 Sheets-Sheet 1

INVENTORS:
ROBERT E. BOSE
ERNEST C. FITCH, JR.
CHARLES R. GERLACH
BY *Head & Johnson*
ATTORNEYS

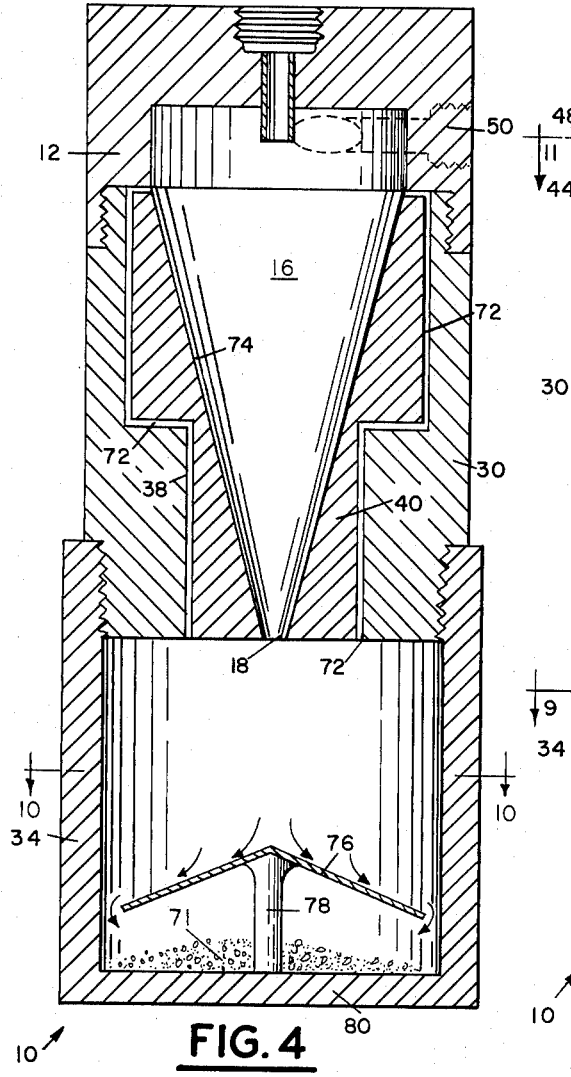
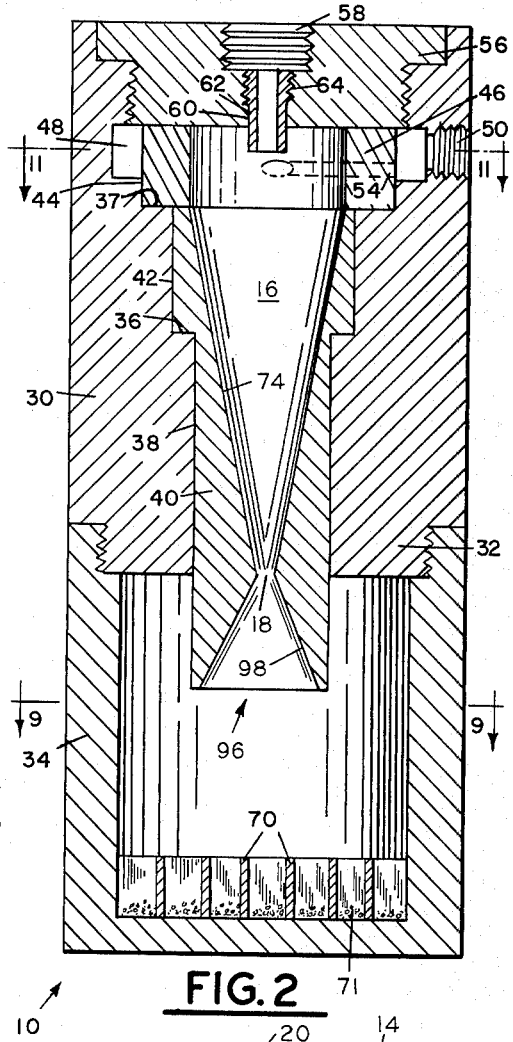
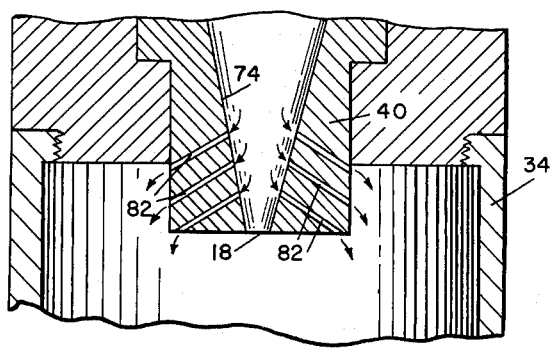
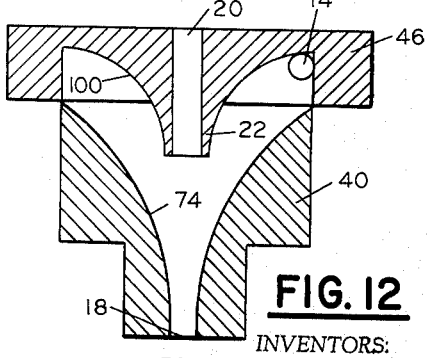

Feb. 15, 1966  R. E. BOSE ETAL  3,235,090
HYDROCLONES

Filed Dec. 15, 1961  3 Sheets-Sheet 3

INVENTORS:
ROBERT E. BOSE
ERNEST C. FITCH, JR.
CHARLES R. GERLACH

BY Head & Johnson
ATTORNEYS

United States Patent Office 3,235,090
Patented Feb. 15, 1966

3,235,090
HYDROCLONES
Robert E. Bose, Ernest C. Fitch, Jr., and Charles Richard Gerlach, Stillwater, Okla., assignors to Oklahoma State University of Agriculture & Applied Science, Stillwater, Okla., a corporation of Oklahoma
Filed Dec. 15, 1961, Ser. No. 159,696
1 Claim. (Cl. 210—512)

This invention relates to cyclone separators. More particularly, the invention relates to improvements in cyclone separators making possible the separation of dense components from fluids at a higher degree of efficiency than heretofore obtainable.

Cyclone separators are well known in industry as a means of separating heavier components, such as solids, from liquids and gases. Cyclone separators, when used to separate heavier components from liquids, are frequently termed hydrocyclones, or hydroclones. This invention will be described as it particularly relates to hydroclones, it being understood that the principles of the invention are equally adaptable to the separation of heavier components from gases, the term "fluid" as used herein including both liquid and gases. Heavier components as used herein include any components, whether solid, liquid or gas, dispersed in a base medium having a lower specific gravity than the heavier components. For purposes of simplicity, the invention will be described as it is applied to separate solid particles, such as dirt particles, from a liquid, such as hydraulic fluid.

The basic principle of the hydroclone includes the introduction of a liquid containing suspended solid matter tangentially into the top of an inverted cone so that the liquid or gas is caused to flow circumferentially within the cone. As the flow approaches the apex of the cone the diameter becomes less and the centrifugal force greater. The centrifugal force exerted by the circumferential flow within the hydroclone is such that solid matters are propelled exteriorly of the stream flow whereas the outlet from the hydroclone is taken from the interior. Thus, centrifugal force is utilized as a means of separating the solids from the liquid.

The basic hydroclone is successful in operation, as testified by its wide application in industry, when fairly heavy solid particles are to be separated from fairly low viscosity fluids. It is not too difficult to introduce sufficient centrifugal force to cause the heavy suspended solid particles to be extracted from comparatively light and low viscosity fluid.

The separation of solids from the fluid is achieved when the centrifugal force of the circumferential flow on the solids exceeds the radial component of force applied on the particles by the tangential component of the inward movement of the liquid flowing from the exterior of the hydroclone to the interior to escape by the centrally positioned outlet. It can be seen that when very small particles, perhaps of only a few microns in diameter, are to be separated from fluids having fairly high viscosity, such as hydraulic oils, the problem of separation in the hydroclone increases immensely. Assuming that the particles are perfectly spherical in shape, it is known that the ratio of the area of the surface to the volume of the particle increases inversely with the size of the particle. Thus, a very small particle has a higher ratio of surface area to volume than a larger particle. This means that a small particle has a higher ratio of surface area to weight than the larger particle since weight is directly proportional to volume. In addition, the tangential component of the inward flow of fluid in moving toward the central outlet opening has an increased tendency to drag solid components with it when the fluid is of relatively high viscosity.

It can be seen that in order to separate very small particles from more viscous fluids it is imperative that extremely high centrifugal forces be obtained compared to the radial component of force applied to the particle by the inward movement of the liquid. In order to achieve separation of very small particles from higher viscosity fluids, it is necessary that the parameters of the hydroclone be accurately controllable. Heretofore, when any factor, such as viscosity, temperature, pressures, particle size, separation requirements, particle density, and so forth, was altered, it was necessary to provide a completely redesigned hydroclone. It is one object of this invention to provide a hydroclone having interchangeable components such that the parameters of the hydroclone may be quickly and easily changed to adapt the hydroclone to varying conditions.

Another object of this invention is to provide a hydroclone having a vortex finder member extending within the cone to intercept the forced vortex flow of fluid within the cone to more efficiently extract fluid which has been thoroughly cleaned from the hydroclone.

Another object of this invention is to provide a hydroclone having an underflow pot in communication with the cone through the cone apex adaptable to provide an area of substantial quiesence where ejected solid particles may settle out.

Another object of this invention is to provide a hydroclone having an underflow pot in communication with the cone portion of the hydroclone through the apex of the cone to provide an area of substantial quiesence where ejected dense particles may settle out of the fluid and to further provide baffle partitions in the underflow pot to prevent the particles which have settled out of the liquid from being returned to suspension by turbulence of the liquid.

Another object of this invention is to provide a hydroclone having highly improved characteristics including an underflow pot system having grates in the bottom portion whereby particles once separated in the hydroclone are prevented from going back into suspension in the system.

Another object of this invention is to provide a hydroclone having a subcone integrally formed therewith whereby more effective particle separation is obtained.

Another object of this invention is to produce a hydroclone having a combination of novel embodiments capable of separating suspended solid particles from fluids to a degree of effectiveness heretofore not obtainable.

Another object of this invention is to provide a hydroclone which may be more inexpensively manufactured and assembled, more versatile in application, and more efficient than other known hydroclones available today.

These and other objects and a better understanding of the invention may be had by referring to the following description and claim taken in conjunction with the attached drawings in which:

FIGURE 1 is an isometric view of the basic hydroclone principle utilized in this invention including the provision of an underflow pot for improved separation of suspended solids.

FIGURE 2 is a cross-sectional view of an improved hydroclone of this invention having a replaceable and interchangeable vortex ring, cone member, and vortex finder whereby the parameters of the hydroclone may be easily and quickly altered to those required under various physical conditions to achieve the desired degree of separation. FIGURE 2 also discloses an underflow pot system of this invention having a grate formed in the lower portion and a subcone integrally formed with the cone member.

FIGURE 4 is a cross-sectional view of a hydroclone showing the provision of a rotating cone member and, in addition, showing an improved type of baffle for the underflow pot of the hydroclone.

FIGURE 5 is a cross-sectional view of a portion of a hydroclone showing the provision of perforations in the cone tip as a means of conducting separated particles more efficiently into the underflow pot.

FIGURES 8A and 8B show, by comparison with each other, how the parameters of the vortex finder may be varied.

Figure 9:
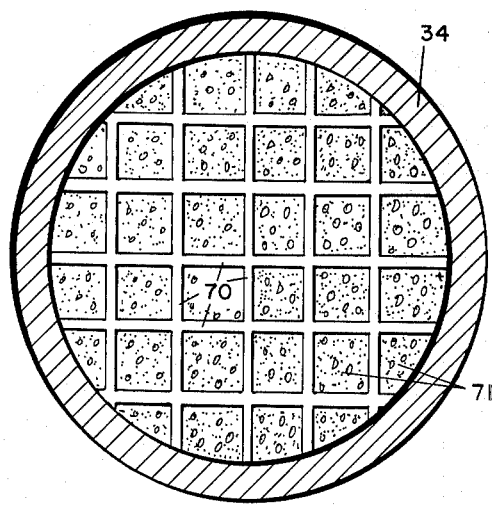

FIGURE 9, a cross-sectional view taken along the line 9—9 of FIGURE 2, discloses one configuration of the grates formed in the bottom of the underflow pot.

Figure 10:
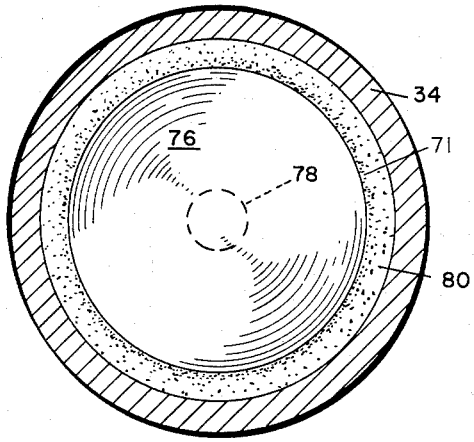

FIGURE 10, a cross-sectional view taken along the line 10—10 of FIGURE 4, discloses the positioning of a baffle in the underflow pot of the hydroclone as a means of preventing ejected particles from returning to the fluid system.

Figure 11:
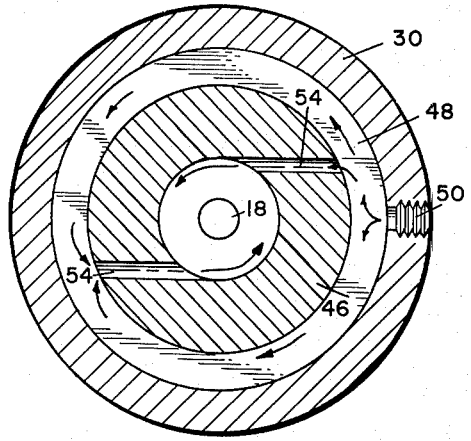

FIGURE 11, a cross-sectional view taken along the line 11—11 of FIGURE 2, discloses the positioning of the vortex ring in the hydroclone and the paths of fluid flow to the interior of the vortex ring.

FIGURE 12 is a cross-sectional view, in reduced scale, of an alternate embodiment of the vortex ring member and the cone member of FIGURE 4. The embodiments of FIGURE 12 disclose a cone member having a parabolic internal configuration to achieve more effective particle separation, and a vortex ring member having a parabolic internal configuration to achieve reduced fluid flow turbulence and thereby greater particle separation.

Figure 1:
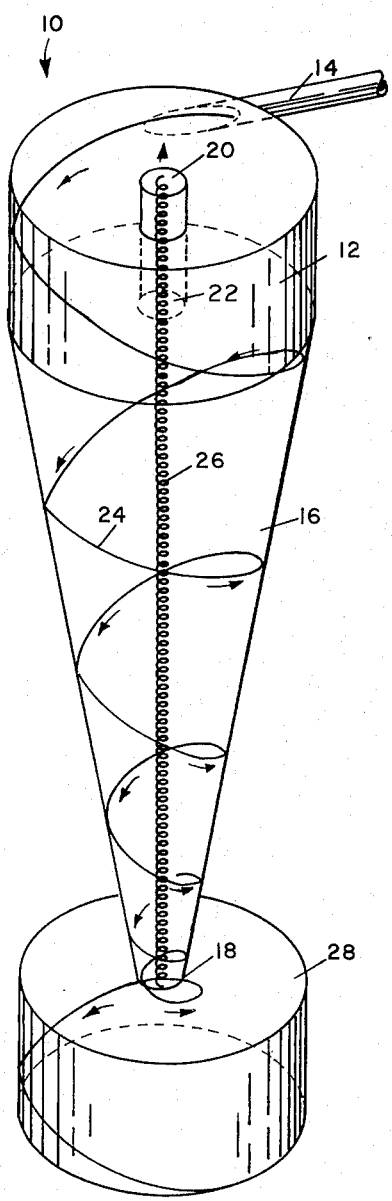

Referring now to the drawings and first to FIGURE 1, a hydroclone, generally indicated by the numeral 10, is diagramatically shown. The basic elements of the hydroclone include the head portion 12 which is of a hollow cylindrical configuration and which is tangentially intersected by an inlet tube or nozzle 14. Affixed to head portion 12 is a cone 16 which may also be termed a cyclone section and which extends downwardly at a continuously reduced internal diameter to a point of truncation, or apex opening 18. Apex opening 18 is the point of minimum internal diameter of the truncated cone 16.

Extending axially and centrally of head portion 12 is an outlet tube 20. Extending interiorly of head portion 12 is a length of the outlet tube 20 which may be termed a vortex finder 22, shown dotted in FIGURE 1.

Fluid entering the hydroclone 10 through inlet tube 14 intersects the interior of head portion 12 tangentially and flows circuitously within head 12 and down through cone 16 as shown. The circuitous flow in head 12 and cone 16 imparts a centrifugal force to the fluids and its heavier components. When separation of small particles is required, especially from a viscous fluid, it is important that extremely high centrifugal forces be imparted to the solid particles.

The general course of fluid flow in the hydroclone is indicated by the numerals 24 and 26. Fluid entering inlet tube 14 intersects the interior of head portion 12 tangentially and flows circuitously against and adjacent the interior of cone 16 in what may be called a free vortex path 24. Fluid, in order to escape the hydroclone through axially positioned outlet 20, flows inwardly but maintains a circuitous, swirling motion which may be termed a forced vortex path 26.

Cone 16 forms the cyclone section of the device wherein the cyclone movement of fluid is produced. Head 12 may be termed the base of cone 16, the interior configuration of the cone 16 converging axially in one direction to a point of truncation forming apex opening 18 and diverging axially in the opposite direction to the base or head 12. In its simplest embodiment, considering the head 12 to be an integral part of cone 16, the inlet tube 14 may be said to tangentially intersect the cone 16.

When fluid is forced at a high velocity through inlet tube 14, it experiences a tremendous centrifugal effect by free vortex path 24 and forced vortex path 26. Solid particles in the fluid are expelled outwardly and downwardly by the centrifugal fluid flow to be expelled from cone 16 through cone apex 18. Clean fluid, extracted of solid particles, flows out vortex finder 22.

In the typical hydroclone, an outlet, which may be controlled by a valve or other means, is provided at apex 18 so that the ejected solid matter may be drawn off along with a portion of fluid. It has been learned that the effectiveness of the hydroclone is materially improved by provision of an underflow pot 28. Underflow pot 28 is formed of a container, preferably cylindrical in configuration, and of a diameter substantially larger than the diameter of apex 18. Fluid containing the ejected solid particles enters the underflow pot 28 and is there exposed to a zone of relative quiesence, permitting the solid particles to settle out.

The provision of underflow pot 28 exposes a rather large volume to the comparatively restricted apex 18 of cone 16. Without the underflow pot 28, solids are accumulated in the bottom of the cone 16 and the area adjacent and above the apex 18, where they remain subject to the turbulent fluid flow within cone 16 and are thereby more readily churned back into suspension. The underflow pot 28 permits the ejected solid particles to enter and settle out in an area where the likelihood of turbulence forcing them into suspension is greatly minimized.

As has been previously described, the basic hydroclone shown diagrammatically in FIGURE 1, with the underflow pot provision, is adaptable for many types of separation wherein solids or other heavier components are suspended in liquids or gases. It can be seen that the dimensions of the hydroclone components will vary considerably according to various physical factors such as the volume of fluid being handled, the viscosity of the fluid, permissible pressure drop across the hydroclone, the particle size of the solids desired to be separated, and the degree of separation required. Heretofore it has been nesessary when different physical factors were introduced to design a completely new hydroclone 10. An important novel feature of this invention is the provision of a hydroclone having interchangeable components so that the parameters of the hydroclone may be altered readily, quickly and inexpensively to meet the requirements of different separating conditions. The novel features of the invention attaining these desirable characteristics are disclosed in FIGURE 2.

Referring to FIGURE 2, a cylindrical body member 30 has a threaded portion 32 at the lower end thereof adaptable to receive an underflow pot 34. The body member 30 is tubular having two ledged areas 36 and 37. Extending from the upper ledge area 37 to underflow pot 34 is a cylindrical opening 38 adaptable to receive a removable cone member 40. The interior of cone member 40 is equivalent to cyclone section 16 of diagrammatic FIGURE 1 and is so identified. Cone member 40 is of a cylindrical external configuration having a larger diameter upper portion 42 which is reduced by a ledge area conforming to ledge 36 of body member 30. Cone member 40 is adaptable to be slideably inserted or removed from body member 30 so that a multiplicity of cone members 40 having different internal configurations may be easily positioned within the body member 30.

The provision of ledged area 36 in body member 30 and the mating ledged area of the exterior cylindrical surface of cone member 40 serves as a means of maintaining the cone member 40 in its proper place in body member 30. Many other arrangements will be suggested. For instance, ledged area 36 may be eliminated so that opening 38 is of a continuous cylindrical diameter with cone member 40 of a substantially equal but smaller external diameter to be slideably positionable in opening 38. Cone member 40 may be then retained in position, such as by a bolt (not shown) screwably positioned in a threaded hole in the wall of body member 30 (not shown) engaging cone member 40.

Communicating with the cylindrical cone opening 38 is a larger diameter cylindrical vortex ring opening 44 which forms upper ledged area 37. Vortex ring opening 44 is adaptable to removably receive a tubular vortex ring 46. Surrounding vortex ring 46 is a fluid passage 48 which communicates with inlet opening 50. Fluid which is to be extracted of its solid contents is injected under pressure through inlet opening 50 to pervade fluid passage 48.

Figure 3:
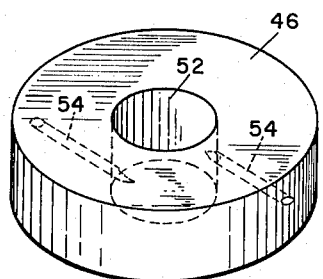
FIGURE 3 is an isometric view of a replaceable vortex ring head for use in the hydroclone of FIGURE 2.

Vortex ring 46 is best shown in FIGURE 3. The vortex ring 46 is of a substantially flat tubular configuration having a diameter to slideably fit vortex ring opening 44. The diameter of vortex opening 52 in vortex ring 46 may vary according to that required to achieve varying degrees of separation and so forth. Communicating from the exterior of the vortex ring 46 are fluid passages 54 which intersect vortex opening 52 tangentially. There may be one or more fluid passages 54 depending on the characteristics desired. It can be seen that by the provision of fluid passage 48 in body member 30 (see FIGURE 2) fluid which flows into the hydroclone from inlet opening 52 will completely surround the vortex ring 46 so that as many fluid passages 54 as desired may be provided. The tangential intersection of fluid passages 54 causes the fluid entering vortex opening 52 to swirl, imparting centrifugal force to the suspended solid particles. This swirling path of the liquid, augmented by the internal configuration of cone member 40, results in the extraction of the solid particles from the fluid.

Referring again to FIGURE 2, the upper cylindrical interior of body member 30 is threaded to receive an externally threaded vortex ring retainer member 56. As retainer member 56 is screwed into body member 30, pressure is applied against the top of vortex ring 46 to force and seal it against upper ledge 37. At the same time, engagement of vortex ring 46 with cone member 40 forces cone member 40 to engage lower ledged area 36 so that it is firmly supported in the body member 30. It can be seen that by removing retainer member 56 from body member 30 both the vortex ring 46 and cone member 40 may be easily and quickly removed and replaced with other components having different internal configurations to impart different characteristics to the hydroclone.

Figure 8:
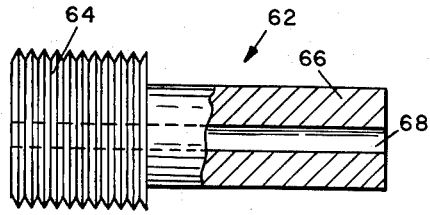
FIGURE 8A is a view, shown partially in cross-section, of a replaceable vortex finder for use in the hydroclone of FIGURE 2.
FIGURE 8B is likewise a view, shown partially in cross-section, of a replaceable vortex finder for use in the hydroclone of FIGURE 2.
Figure 8:
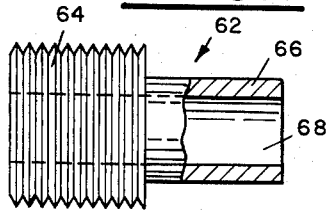

In the center of vortex ring retainer member 56 is a larger threaded opening 58 adaptable to receive connections of an outlet tube (not shown) whereby fluid is conducted away from the hydroclone 10. Coaxially with threaded opening 58 is a vortex finder opening 60 having the upper portion thereof threaded. Adaptable to extend within vortex finder opening 60 is a removable vortex finder member 62 which has an integrally formed upper externally threaded portion 64. The vortex finder member 62 may be of a variety of configurations adaptable to vary the characteristics of hydroclone 10. An example of the variety of configurations which vortex finder member 62 may attain is shown in FIGURES 8A and 8B. In FIGURE 8A the vortex finder member 62 is equipped with an integrally formed shank portion 66 to extend at a greater depth within vortex ring 46. In the configuration of FIGURE 8A the opening 68 through which fluid passes out of the hydroclone 10 is of a small, more restricted diameter. FIGURE 8B discloses an alternate embodiment wherein the shank portion 66 is of a relatively short length so that it does not extend to a substantial distance within vortex ring 46. In this embodiment the opening 68 is of a larger diameter. Thus, it can be seen that the length of shank portion 66 and the diameter of opening 68 may vary over a wide range. By inserting a different vortex finder 62 into vortex finder opening 60 in the vortex ring retainer member 56, the characteristics of the hydroclone 10 can be substantially changed.

The hydroclone 10 of FIGURE 2 provides a separating device, the parameters and characteristics of which may be easily and quickly varied by replacing cone member 40, vortex ring 46 and vortex finder 62.

In order to further improve the efficiency of underflow pot 34, FIGURE 2 discloses a system of grid members 70 placed in the bottom of pot 34 to interrupt fluid flow and fluid turbulence. Solid particles 71 extracted in cone 16 enter underflow pot 34 through apex 18 and settle out between grid members 70. Grid members 70 substantially diminish the effect of turbulence in underflow pot 34 to prevent the extracted solid particles 71 from being taken back into suspension in the fluid.

Underflow pot 34 may be removed from body member 30 by unscrewing it from the threaded portion 32 to empty the solid particles which have been extracted from fluid flowing through the hydroclone. It can be seen that if desirable, a valve controlled discharge opening (not shown) may be placed below the system of grid members 70 to permit the discharge of fluid containing the rejected solid particles.

The primary novelty of the hydroclone of FIGURE 2 lies in the versatility of the device, the versatility being assured in that each critical parameter of the hydroclone may be altered, including cone 40, vortex ring 46, and vortex finder member 62. Each of these components may be easily changed to comply with the requirements of any fluid cleaning problem. The novelty of this design makes possible great savings when the cleaning of fluids is undertaken, which fluids are not commonly encountered and for which some experimentation may be required to determine the proper parameters to achieve the degree of extraction required.

Another novel feature of this invention is disclosed in FIGURE 4. The hydroclone 10 of FIGURE 4 is substantially equivalent to that of FIGURE 2 except lacking in the interchangeable novelty elements of FIGURE 2, with the further difference in that the cone member 40 is formed so that it floats, or is rotatable. In this arrangement, cone member 40 is made slightly smaller in diameter than cylindrical cone opening 38 in body member 30 so that when fluid is exerted under pressure into inlet opening 50 and fills the interior of hydroclone 10, fluid is exerted in the annulus 72 between the cone member 40 and body member 30. As fluid from fluid inlet opening 50 enters the head portion 12 of hydroclone 10 tangentially, a violent swirling effect occurs which imparts rotary motion to cone member 40. The speed of rotation of cone member 40 will always, of course, be less than the peripheral velocity speed of the fluid rotating within the cone member 40, but the rotation of the cone member 40 reduces the frictional drag of the contact area between the fluid and the interior surface 74 of cone member 40. This means that there is less frictional energy consumed by the rotation of fluid within cone member 40, assuring a higher circular velocity which imparts greater centrifugal force to solid particles suspended in the fluid. The provision of a cone 40 which rotates by the effect of fluid tangentially entering head 12 substantially increases the efficiency and effectiveness of the hydroclone 10 in removing minute suspended particles from the fluid.

The pressure of fluid within the hydroclone filling the annulus 72 serves as a lubricative suspension medium between the cone member 40 and body member 30. The system shown in FIGURE 4 is especially useful when a liquid such as hydraulic fluid is being forced through the hydroclone. It is possible, as an alternate arrangement, to mount the cone member 40 on a bearing suspension system and in another obvious embodiment to provide mechanical means to insure the rotation of cone member 40. However, such improvements are more expensive to manufacture and introduce a great many problems, especially when high pressures are required.

Shown in FIGURE 4 is an alternate arrangement of a means to prevent ejected solids from being taken back into solution. An inverted cone 76 of a diameter smaller than the internal diameter of underflow pot 34 is supported to the bottom 80 of pot 34 by a stem 78. Solids which enter the underflow pot 34 through apex 18 of cone 16 flow off the top surface of inverted cone 76 to be deposited under the inverted cone 76 against the bottom 80 of the underflow pot 34. Inverted cone 76 acts as a shield or baffle to limit the turbulence of fluid under the inverted cone 76 to prevent the ejected particles from going back into suspension. FIGURE 10 shows a top view of the arrangement of the inverted cone 76 baffle within underflow pot 34.

FIGURE 5 discloses an improvement in hydroclones which is effective to materially improve the efficiency in separating very small solid particles from fluids. In this embodiment, cone member 40 protrudes within the underflow pot 34. A series of perforations or small diameter fluid passages 82 are formed in the lower portion of cone member 40 communicating between the interior surface 74 of the cone member 40 and the interior of underflow pot 34. By this arrangement, as the solid particles are forced to the exterior of fluid flow and to the cone inner surface 74 by centrifugal effect due to the violent rotation of fluid within cone member 40, the solid particles encounter perforations 82. These perforations offer a fluid passage by which the solid particles may flow directly into underflow pot 34. Thus, there will be a small circuitous flow of liquids from within cone member 40 through perforations 82, into underflow pot 34 and from underflow pot 34 back into cone member 40 through apex opening 18. The fluid flowing through perforations 82 will be laden with extracted solid particles which will settle in the relatively turbulent free area of underflow pot 34.

The provision of perforations 82 affords a means whereby the solid particles which are forced to the exterior of the swirling fluid within cone member 40 escape, and thereby improved effectiveness and efficiency is attained in the extraction of solid particles from the fluid.

Figure 6:
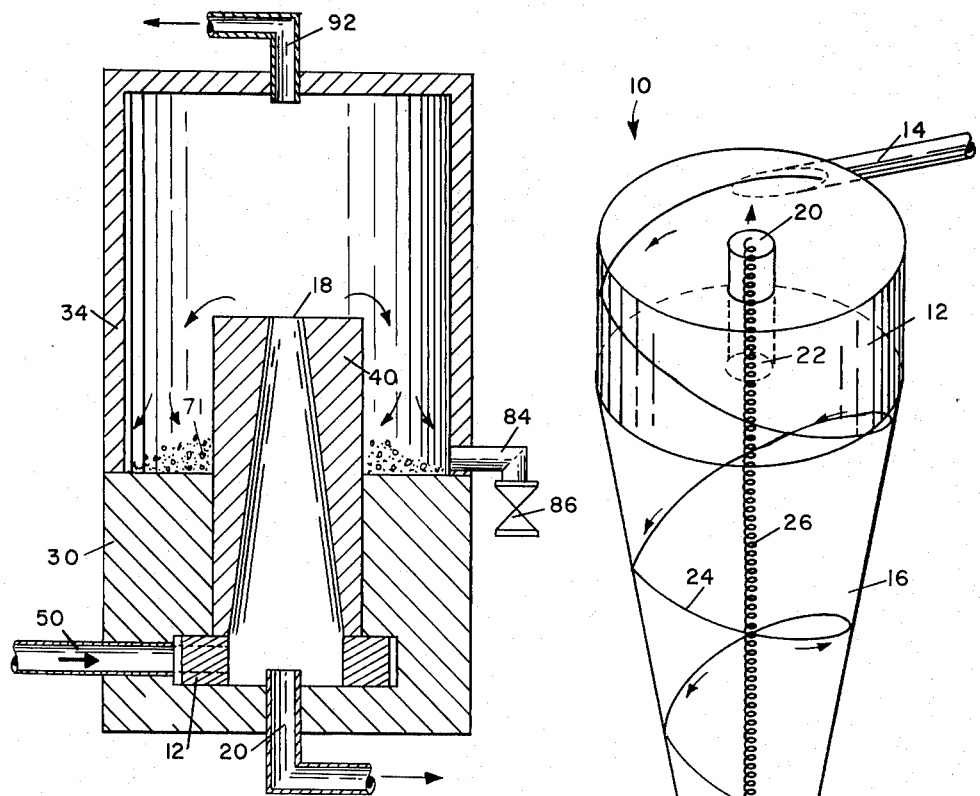
FIGURE 6 is a cross-sectional view of an inverted hydroclone of this invention showing the positioning of the overflow pot above the cone whereby improved means of separation of particles in the overflow pot is obtained.

An additional arrangement of a hydroclone which improves the effectiveness of the hydroclone system as a means of extracting solid particles from liquids is shown in FIGURE 6. In this system the hydroclone, substantially as shown in FIGURE 2 or FIGURE 4, is inverted so that the underflow pot 34 is now located above body member 30. Cone member 40 is positioned to extend above body member 30 and substantially into underflow pot 34. As fluid enters inlet tube 50 to flow tangentially into head 12, the fluid violently swirls within cone member 40. The solid particles are ejected to the exterior of the fluid and out apex 18 into underflow pot 34. Ejected solid particles 71 then settle around the cone member 40 extending within underflow pot 34. Fluid flows out of the system through outlet tube 20. To drain away liquid containing the ejected solids, a drain opening 84 may be provided in the underflow pot 34, controlled by a valve 86.

Figure 7:
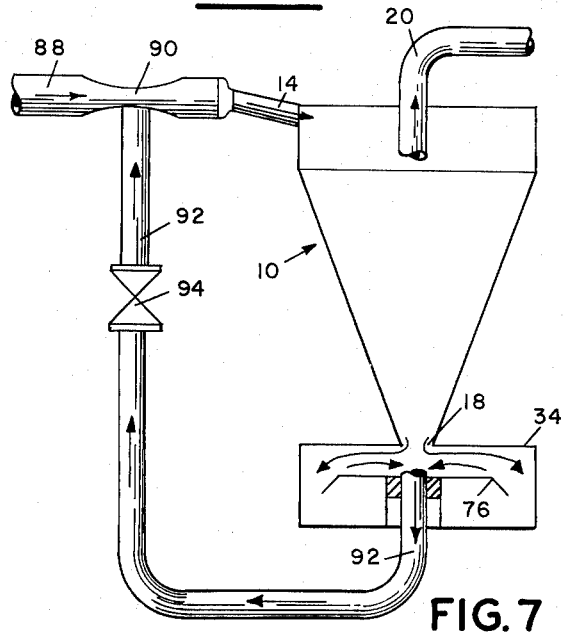
FIGURE 7 is a diagrammatic view of a reflux system according to this invention providing means whereby a portion of the fluid most likely to contain unseparated particles is recirculated to improve the separating efficiency of the hydroclone.

In order to further improve the efficiency of the hydroclone system to separate very minute solid particles from a fluid, an additional important novel feature of this invention includes a reflux system as shown diagrammatically in FIGURE 7. Fluid enters the system by supply line 88 and flows through a venturi 90 and thence into inlet tube 14. The hydroclone 10 may be of the standard design or preferably incorporates the other novel elements of this invention. Fluid flows out of hydroclone 10 through outlet tube 20. Affixed to the lower portion of the hydroclone 10 is an underflow pot 34 including a baffle 76, similar to that shown and described in FIGURE 4 and FIGURE 10. Extending upwardly through the center of baffle 76 is a reflux tube 92. Reflux tube 92 communicates with venturi 90 through a valve 94. The flow of fluid from supply line 88 to inlet tube 14 through venturi 90 draws fluid through reflux tube 92, the amount of fluid being controlled by factors such as the velocity of fluid through venturi 90, the design of venturi 90, and, more importantly, by valve 94.

Fluid entering underflow pot 34 through cone apex 18 is laden with ejected solid particles, the clean fluid having escaped from the system through outlet tube 20. When fluid containing ejected solids flows through apex 18, the centrifugal force will cause the heaviest fluid, that containing most ejected particles, to flow outwardly in the directions of the arrows, so that the solids are expelled to the outside of underflow pot 34 and come to rest under baffle 76. A portion of fluid entering underflow pot 34 through apex 18 flows through reflux tube 92 to ultimately re-enter hydroclone 10 for retreatment. In this manner, the fluids most likely to contain ejected solids are recirculated to insure a higher cleaning efficiency.

The venturi 90 may be replaced with a pump means of recirculating fluid taken into reflux tube 92.

The reflux system of FIGURE 7 may be applied to the inverted hydroclone of FIGURE 6 by the provision of a reflux tube 92 inserted in the top of underflow pot 34 connected to a venturi (not shown) leading to inlet opening 50.

Hydroclones are typically constructed having an inverted cone abruptly truncated at the apex through which ejected heavier components leave the system. The provision of an abrupt truncation of the cone causes an area of turbulence at a critical point in the hydroclone system. This turbulence has a tendency to retain particles in the fluid at the point where they should be leaving the system. To overcome this problem, a novel and unique alteration is made in the configuration of the interior cone design as shown in FIGURE 2. In this arrangement a subcone, generally indicated by the numeral 96, is integrally formed with cone member 40. After converging to apex 18 the cone interior surfaces 74 diverge, as indicated by the numeral 98, so that turbulence in the area of apex 18 is substantially eliminated. Apex 18 represents the separation point between the zone of fluid separation in cone 16 and the zone of quiesence in underflow pot 34. The provision of subcone 96 makes this point of separation less turbulent to improve the effectiveness of particle separation.

The effectiveness of a cyclone separator is directly dependant upon the centrifugal force imparted by circular fluid flow. FIGURE 12 discloses elements of a cyclone separator having improved design capable of imparting stronger centrifugal forces. Whereas the usual hydroclone is provided with a conic cyclone section wherein the cyclone inner surface 74 is in a straight line, all sides converging to a truncated point or apex, the cyclone section of cone member 40 of FIGURE 12 is provided with an inner surface 74 defined as a hyperbola of revolution. The provision of a hyperbolic hydroclone cyclone section 40 provides a substantially improved vortex pattern providing a stronger centrifugal field to achieve better particle separation.

The cone member 40 of FIGURE 12 is shown, on a reduced scale, of a type adaptable to be inserted in a body member 30 of FIGURE 2. The application of the hyperbolic hydroclone section may be applied equally as well to other types of hydroclones not having the interchangable component of FIGURE 2.

FIGURE 12 also discloses an improved configuration of vortex ring 46. In this arrangement vortex ring 46 is provided with outlet opening 20 by which fluid leaves the interior of the hyperbolic hydroclone section 40. To avoid turbulence and to impart a better vortex pattern, the upper interior surface 100 of the vortex ring 46 of FIGURE 12 curves downwardly to meet the outlet tube 20 and thereby to substantially conform to the adjacent inner surface 74 of cone member 40.

The novel elements of this invention disclose improvements in hydroclones which make possible the separation of solids from fluids when the solids are of very low micron size. Under experimental conditions, the novel elements and designs of this invention have successfully separated very minute particle sizes of only a few microns in diameter from such hard to separate fluids as hydraulic fluid. The achievement of results with the novel elements of this invention has exceeded the heretofore obtainable degrees of separation.

The novel elements of this invention may be combined in various arrangements or all of the elements of the invention ideally may be combined into one hydroclone unit having an efficiency entirely unobtainable by previously known methods.

Although this invention has been described by a certain degree of particularity, it manifests that many changes may be made in the details of construction and the arrangement of components without departing from the spirit and the scope of this disclosure.

What is claimed is:

A cyclone separator comprising:
an upright body member having a tubular opening therethrough, said body member having an intermediate internal shoulder and an inlet opening in one side thereof adjacent the upper end;
a removable head member having an axial discharge opening therein, said head member closing the upper end of said body member;
a removable vortex ring member having a cylindrical internal diameter, said vortex ring member being secured in axial alignment within the upper end of said body member by said head member, said vortex ring member having at least one inlet opening tangentially intersecting the internal diameter thereof and communicating with said inlet opening in said body member;
an upright removable cone member positioned in axial alignment within the tubular opening of said body member, said cone member having an external shoulder mating with said internal should in said body member whereby said cone member is firmly supported in said body member, said cone member having an internal configuration defined by an upper truncated cone portion and a coaxial lower truncated cone portion, said upper and lower cone portions meeting at the point of truncation of each cone, said point of truncation forming an apex opening, the cone member engaging said vortex ring member at its upper end;
a removable underflow pot closing the lower end of said body member, said underflow pot having communication with the interior of said cone member through said apex opening; and
a grid baffle in said underflow pot to trap sediment therein.

References Cited by the Examiner

UNITED STATES PATENTS

| | | | |
|---|---|---|---|
| 2,098,608 | 11/1937 | Berges | 210—512 |
| 2,590,691 | 3/1952 | Fontein | 209—211 X |
| 2,649,963 | 8/1953 | Fontein | 210—512 X |
| 2,717,536 | 9/1955 | Clark et al. | 210—512 X |
| 2,754,968 | 7/1956 | Vegter et al. | 210—512 |
| 2,776,053 | 1/1957 | Krebs | 209—211 |
| 2,816,658 | 12/1957 | Braun et al. | 210—512 X |
| 2,840,240 | 6/1958 | Snyder | 210—512 |
| 3,034,647 | 5/1962 | Griesse | 210—512 X |

FOREIGN PATENTS

| | | |
|---|---|---|
| 1,037,980 | 9/1953 | France. |
| 607,787 | 9/1948 | Great Britain. |
| 712,792 | 7/1954 | Great Britain. |

REUBEN FRIEDMAN, *Primary Examiner.*

HERBERT L. MARTIN, *Examiner.*